(No Model.)
C. T. MACKLEY
MATCH.
No. 348,679. Patented Sept. 7, 1886.
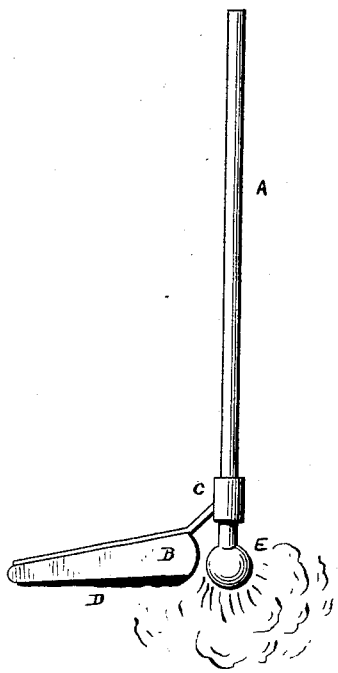
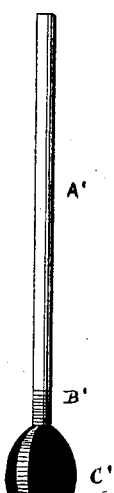
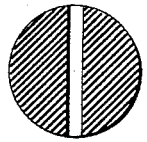
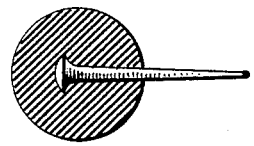
WITNESSES:
INVENTOR
Carl Thomas Mackley
BY Goepel & Raegener
ATTORNEYS.

UNITED STATES PATENT OFFICE.

CARL THOMAS MACKLEY, OF INNSPRUCK, TYROL, AUSTRIA-HUNGARY.

MATCH.

SPECIFICATION forming part of Letters Patent No. 348,679, dated September 7, 1886.

Application filed March 11, 1886. Serial No. 194,927. (Specimens.) Patented in England February 8, 1886, No. 1,822.

*To all whom it may concern:*

Be it known that I, CARL THOMAS MACKLEY, of 10 Meinhart strasse, Innspruck, Tyrol, Austria-Hungary, gentleman, have invented certain new and useful Improvements in Matches, (for which I have applied for Letters Patent in Great Britain, No. 1,822, dated February 8, 1886,) of which the following is a specification.

The usual method of applying sealing-wax, wax, rubber cement, or like cementing substances is by holding the stick of sealing wax or cement in the flame of a match or candle, which, if either of the latter be held in one hand, necessitates the use of the other to hold the stick of sealing wax or cement, and frequently the fingers are burned if the stick of sealing wax or cement is short. Now, by my invention I can apply the flame to melt the wax or cement by one hand only, leaving the other free to manipulate the article to which the wax or cement is to be applied, and I entirely obviate the burning of the fingers; and the invention consists in a match having a metal or other holder applied to the same in proximity to the igniting or other portion of the match, said holder carrying sealing-wax, rubber, cement, or other suitable material to be melted on igniting the match.

Referring to the accompanying drawings, and to the figures and letters of reference marked thereon, Figure 1 is an elevation of one method of carrying my invention into practice, and Fig. 2 is a simpler and cheaper method.

In Fig. 1, A is the match-stem, which may be of wood or of vitreous or of other incombustible material, or of material partly or wholly rendered incombustible. B is a metal or other sheath or stand affixed thereto by support C or otherwise. I may turn up the edges of B to better hold the sealing wax or cement D, applied thereto. E is the inflammable compound, preferably of the "safety" kind, igniting on a prepared surface only. After use the sheath B can be again charged with wax or cement.

In Fig. 2, A' is the match-stem, which, if of wood, may be rendered incombustible by any method up to, say, B', if desired. C' is the sealing wax or cement, placed on the stem A' by dipping, casting, or applying the same in any suitable manner. For instance, the match might be placed in a mold with its ends projecting, and wax or cement poured in, or melted wax or cement might be taken and applied to the part desired until sufficiently coated or covered therewith, or the material C' might be applied to one side of the match only. E' is the igniting-substance.

I may apply to matches of sufficient size rubber cement for the use of cyclers and others, so the cycle-tires and the like can be fastened when loose by igniting one of my matches and letting the cement drop on the tire and rim of the wheel, or either of them, or on other surfaces to be cemented or joined together.

I do not bind myself to any particular mode of applying sealing wax or cement to a match—that is to say, a stem, rod, sheet, or support carrying inflammable material ignited by friction. For instance, the sealing-wax, rubber, or like cement might be cast in ball or other suitable form, and with a hole or groove to slip onto an ordinary match; or pins might be fixed in the body of the cementing substances to attach the stem to a match; or the sheath or stand might be loaded with cementing substance and then attached by the user to an ordinary match by an eye, pin, or other suitable means.

Fig. 3 shows a ball with a hole in it. Fig. 4 shows a ball with a pin.

I claim—

1. A match having a metal or other sheath or stand applied to the same in proximity to the igniting or inflammable portion of the match, the said sheath or stand carrying sealing-wax, rubber cement, or like cementing material to be melted by igniting the match, substantially as described.

2. A metal base or holder, B, adapted to hold a portion of sealing-wax or other like cement, and provided with means C for attaching such base or holder to a match-stem, substantially as described.

In testimony that I claim the foregoing as my invention I have signed my name in presence of two subscribing witnesses.

CARL THOMAS MACKLEY.

Witnesses:
 CAMILLO TROTTER,
 WILHELM RUTTHOFER.